Sept. 25, 1962 S. L. BROADHEAD, JR., ET AL 3,056,087

NOISE BLANKING CIRCUIT

Filed Oct. 11, 1960 2 Sheets-Sheet 1

INVENTORS
SAMUEL L. BROADHEAD, JR.
EDGAR O. SCHOENIKE
BY Moody and Phillion
ATTORNEYS INVENTORS
SAMUAL L. BROADHEAD, JR.
EDGAR O. SCHOENIKE
BY Moody and Phillips
ATTORNEYS

United States Patent Office 3,056,087

Patented Sept. 25, 1962

3,056,087

NOISE BLANKING CIRCUIT

Samuel L. Broadhead, Jr., and Edgar O. Schoenike, Cedar Rapids, Iowa, assignors to Collins Radio Company, Cedar Rapids, Iowa, a corporation of Iowa Filed Oct. 11, 1960, Ser. No. 61,980
10 Claims. (Cl. 325—478)

Figure 1:
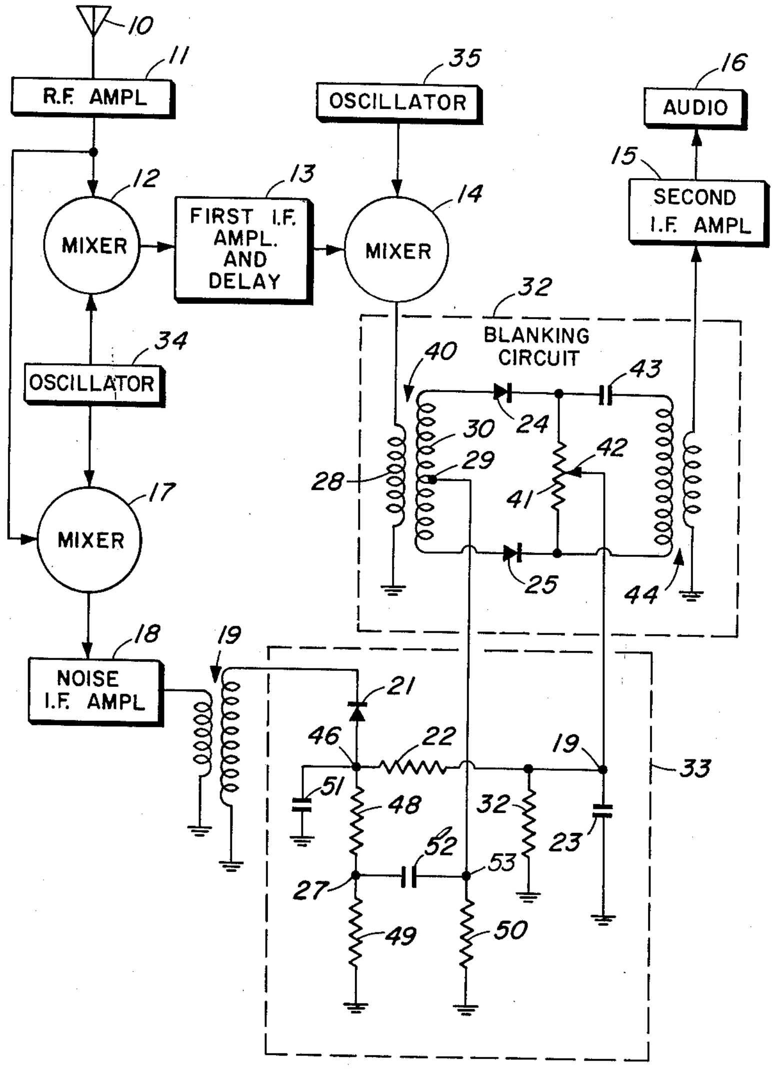

This invention relates generally to noise elimination circuits, and more particularly, to a noise elimination circuit in which the circuit is blanked (opened) in response to noise impulses and wherein the noise bandwidth employed is within the bandwidth of the intelligence bearing signal.

There are in the prior art many different types of devices for blanking receivers in response to noise impulses. However, most of these prior art structures sample the noise from a frequency spectrum which usually lies just outside the frequency bandwidth of the intelligence bearing signal. Such an arrangement usually is suitable since most noise impulses such as, for example, ignition noises cover a rather large frequency bandwidth. Furthermore, it is ordinarily desirable to sample noise outside the intelligence bearing bandwidth to avoid the problem of having the received signal blanked by itself if an otherwise relatively small sample noise signal should coincide with the peak of a pulse of the intelligence bearing signal.

There are, however, some circumstances in which it is more desirable to sample the noise inside the intelligence bearing bandwidth rather than outside thereof. For example, in situations where it is possible that a signal might be jammed, as for instance, by an unfriendly government, it would be impractical to sample the noise signal outside the intelligence bearing signal because the jamming signal would presumably be made to fall within the same frequency bandwidth as the intelligence bearing signal.

Thus, in cases such as where jamming might occur, it would be desirable to have a noise blanking circuit which would blank out the receiver in response to noise pulses sampled from within the intelligence bearing bandwidth but which would be relatively independent of the amplitude of the received intelligence bearing signal.

An object of the present invention is to provide such a noise blanking circuit wherein a receiver will be blanked by noise pulses from within the intelligence bearing bandwidth but which noise blanking circuit will be substantially independent of the received intelligence bearing signal.

A further object of the invention is to provide a blanking circuit designed to prevent noise (and coincident signal) from passing through the receiver but without desensitizing the receiver at times other than the occurrence of the noise.

Another object of the invention is the improvement of noise blanking circuits, generally.

In accordance with the invention there is provided in combination with a first circuit means for processing the received signal to extract the intelligence contained therein, a blanking circuit constructed and arranged to respond to appropriate signals supplied thereto to block said received signal from passing through said first circuit means, and a second circuit means responsive to the output of an appropriate stage of the received signal, such as an I.F. stage, to produce the aforementioned appropriate signals for controlling the blanking circuit.

The blanking circuit comprises an input transformer having a primary winding coupled to some convenient point in the receiver circuit such as the output of a mixer circuit, and having a center tapped secondary winding. The aforementioned secondary winding has diodes connected to either end thereof in a push-pull arrangement. A first D.C. voltage proportional to the received signal is generated by the aforementioned second circuit means and is applied to similar electrodes of the two diodes with such polarity as to bias them into conductivity. A second signal derived directly from noise pulses is produced by said circuit means and is supplied to the tap of said secondary winding with such a polarity as to render the diodes non-conductive, thus effectively blanking the circuit.

The aforementioned second circuit means comprises a diode for rectifying the received signal followed by an I.F. by-pass capacitor and two circuit paths. The first circuit path is in parallel with the I.F. capacitor and includes a first voltage divider followed by an integrating capacitor which functions to produce a D.C. voltage thereacross whose magnitude varies as the average power of the received signal. It is this D.C. voltage which is employed to bias the diodes of the blanking circuit into conductivity; which is the normal state of such diodes in the absence of noise pulses. It is to be noted that the RC time constant of the integrator circuit is too slow to be affected appreciably by any noise spikes. Therefore, the D.C. biasing voltage is dependent almost entirely upon the received intelligence bearing signal. The second circuit comprises a second voltage divider circuit which is connected substantially in parallel also with the I.F. capacitor. A tap on said second voltage divider circuit is connected through a D.C. blocking capacitor to the center tap of the secondary winding of the blanking circuit and supplies the noise pulses thereto.

While the voltage appearing at the tap of the said secondary winding will contain a proportionate amount of the intelligence bearing signal, as well as noise pulses, it is to be understood that if said second voltage divider tap is set at the correct point the peak value of said proportionate amount of the intelligence bearing signal will never be greater than the D.C. voltage produced across the integrating capacitor for any given received signal.

The aforementioned and other objects and features of the invention will be more fully understood from the following detailed description thereof when read in conjunction with the drawings in which:

FIG. 1 shows a schematic sketch of the invention; and

Figure 2:
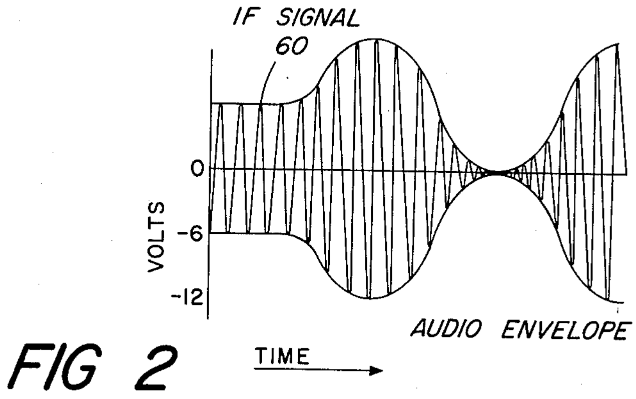
Figure 3:
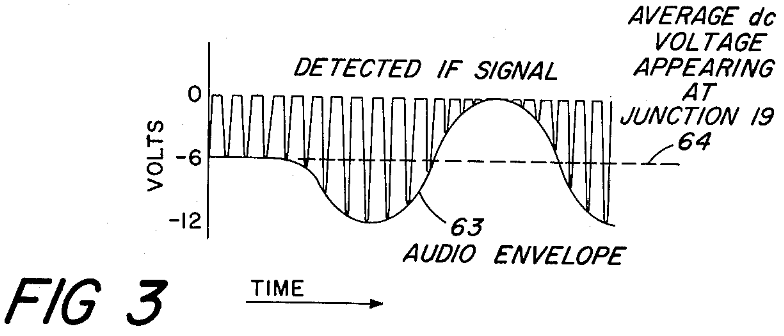
Figure 4:
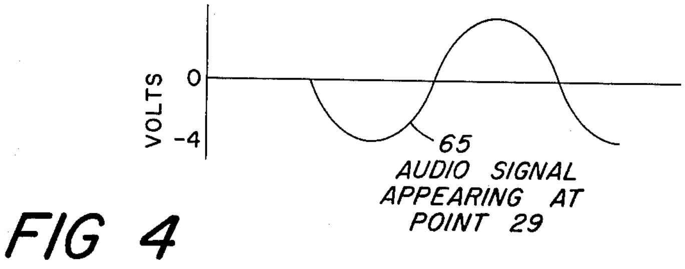

FIGS. 2, 3, and 4 show voltage waveforms at various points in the circuit.

Referring now to FIG. 1, the incoming signal is received by a suitable means such as antenna 10 and supplied to an R.F. amplifier 11. From the R.F. amplifier 11 the signal is supplied to two channels; one of said channels comprising mixer 12, first I.F. amplifier and delay means 13, mixer 14, blanking circuit 32, second I.F. amplifier 15, and audio circuit 16, and the second of said channels comprising mixer 17, noise I.F. amplifier 18, step-up transformer 19 and a circuit 33 for generating the signals to control the blanking circuit 32. The oscillators 34 and 35 function in a well-known manner with mixer circuits 12, 17 and 14 to produce I.F. frequencies.

Generally speaking, the invention is contained within the blanking circuit 32 and the circuit within the dotted rectangle 33. The blanking circuit 32 is connected in series between the mixer 14 and the second I.F. amplifier 15 so that if the blanking circuit is nonconductive a received signal cannot pass from the mixer 14 to the second I.F. amplifier 15 and, of course, will not be supplied to the audio circuit 16.

Specifically, the blanking circuit 32 is comprised of an input transformer 40 having a primary winding 28 and secondary winding 30 with a center tap 29. Connected to the two end terminals of the secondary winding 30 are diodes 24 and 25 arranged in a push-pull manner such that the anodes of both diodes are connected to the respective end terminals of secondary winding 30. As will be described in more detail later, the purpose of these two diodes is to act as gates which are closed or opened depending upon the biasing voltages supplied thereacross; the said biasing voltages being determined by the average power of the I.F. signal on one hand and the magnitude of noise pulses on the other hand. More specifically, a negative D.C. voltage whose amplitude is proportional to the I.F. signal is generated within the block 33 and supplied to the tap 42 of resistor 41 to bias the diodes into a state of conductivity so that the received signal can pass freely from mixer 14 to the second I.F. amplifier 15. When noise pulses of sufficient magnitude occur, however, they are caused to be supplied, from the circuit 33, to the center tap 29 of secondary winding 30. Since such noise pulses are caused to be negative in polarity it is apparent that if they are of sufficient magnitude they will cut off the diodes 24 and 25 so that the received signal cannot flow from the mixer 14 to the second I.F. amplifier 15. In other words, blanking will occur when such a noise pulse cuts off the diodes 24 and 25. The output of the blanking circuit consists of a D.C. blocking capacitor 43 and a transformer 44.

The circuit means in block 33 for generating both the D.C. voltage supplied to the tap 42 of resistor 41 and the noise pulses supplied to the tap 29 of transformer 40 will now be discussed. The received signal is supplied to mixer 17 where the frequency is stepped down to an intermediate frequency and then amplified by noise I.F. amplifier 18. The output signal of noise I.F. amplifier 18, as shown by curve 60 of FIG. 2, is supplied via transformer 19 to a diode 21 which detects the signal.

The I.F. by-pass capacitor 51 functions to remove the I.F. frequency component from the signal appearing at point 46 so that at point 46 there appears only the audio component of the signal and a D.C. voltage; said D.C. voltage being due to the detecting action of diode 21. Such composite signal is shown in FIG. 3 with the audio signal being represented by the curve 63 and the D.C. component by the straight line 64. The magnitude of the D.C. voltage is equal to the average peak value of the I.F. signal which, in turn, is equal to the peak value of the unmodulated I.F. signal. This can be understood more clearly when it is considered that the modulated I.F. signal will vary above and below the unmodulated I.F. signal by equal amounts. For example, with 100% modulation the unmodulated signal will vary in amplitude from a value twice its unmodulated value to zero value. Thus it can be seen that the average peak value of the I.F. signal is equal to the unmodulated value. For purposes of discussion assume that the peak value of the unmodulated I.F. signal, and consequently the D.C. voltage appearing across capacitor 51, is equal to a minus 6 volts. (The peak-to-peak swing of the audio signal, with 100 percent modulation, appearing at point 46 will be 12 volts). If it is further assumed that the magnitude of resistor 32 is twice the magnitude of resistor 22 then the D.C. voltage appearing at point 19 will be a minus 4 volts, with no appreciable A.C. component therein, due to the filtering action of capacitor 23. Such minus 4 volts biases diodes 24 and 25 into conductivity. Thus, the peak negative value of the D.C. voltage that can be supplied to the tap 29 of the secondary winding 30 of transformer 40 without cutting off the diodes 24 and 25 is a minus 4 volts.

From the foregoing it will be apparent that received input signals supplied from the mixer 14 to the transformer 40, which ordinarily are of the order of 25 to 50 microvolts, will pass freely through the conductive diodes 24 and 25 and into the second I.F. amplifier 15. The reason for employing at the junction 19 a D.C. voltage whose magnitude will vary with the average amplitude of the received signal will be described in more detail later herein.

It will now be shown how the noise pulses are supplied to the tap 29 and how such noise pulse will function to cut off the diodes 24 and 25 so as to blank the blanking circuit 32 while at the same time insuring that a large audio signal will not cut off the diodes 24 and 25. It will be apparent that the signal appearing at the point 46, and which contains the aforementioned D.C. component and the audio signal, also contains the noise pulses. These noise pulses appear at point 27 on the voltage divider comprised of resistors 48 and 49 and are conducted through the D.C. blocking capacitor 52 to the tap 29 of transformer 40 to cut off the diodes 24 and 25. It should perhaps be noted at this point that noise pulses usually are of the order of 10 or 20 times the value of the audio signal, so that the circuit will be blanked during practically all serious noise. It can be seen that if the magnitude of noise pulses supplied to the point 29 exceeds the negative biasing potential on the tap 42 of resistor 41 by only a few millivolts in a negative polarity the diodes 24 and 25 will be nonconductive to the signal supplied to the transformer 40 from the mixer 14, since said input signal has a magnitude of only 25 or 50 microvolts.

As indicated hereinbefore, the audio signal appearing at point 27 and supplied to the point 29 through blocking capacitor 52 should never become more negative than the potential of the tap 42 of resistor 41; otherwise the diodes 24 and 25 would be cut off during the reception of the audio signal even in the absence of a noise signal. To insure against such an occurrence the signal appearing at point 46 which includes the audio signal, is divided down by the voltage divider comprised of resistors 48 and 49. As an example, assume that the resistor 49 is twice the magnitude of the resistor 48. Then the peak-to-peak value of the audio signal appearing at point 27 is 8 volts (assuming resistor 50 to be much greater than resistor 49). (Since in the example used hereinbefore, the peak-to-peak voltage of said audio signal at point 46 was assumed to be 12 volts.) Due to the effect of blocking capacitor 52, the D.C. component of the signal appearing at point 27 is removed and only the audio component thereof appears across the resistor 50 as is represented by the curve 65 of FIG. 4. Consequently, the most negative-going point of the audio signal appearing across the resistor 50 is a minus 4 volts, which is equal to the minus 4 volts appearing on the tap 42 of resistor 41. As indicated hereinbefore, it is understood that the maximum negative peak of the audio signal appearing at tap 29 should be a few millivolts less negative than the negative D.C. voltage appearing at the tap 42 of resistor 41. Such an arrangement can be obtained by having the resistor 49 slightly less than twice the value of resistor 48.

It will be noted that the noise pulses appearing at point 46 will have little or no effect upon the D.C. voltage appearing across the capacitor 23 due to the fact that the energy content of noise is usually much less than the energy content of the received signal. Worded in another manner, the RC time constant of the integrating circuit comprised of resistors 22 and 32 and capacitor 23 is comparatively slow, so that there will be no appreciable change of voltage at junction 19 due to noise spikes. It is to be understood, however, that if the noise pulses become extremely frequent and/or contain a sufficient amount of energy, there will be a corresponding change in the D.C. voltage level of junction 19.

The function of resistor 48 is not only to divide down the voltage at point 27 but also to prevent an overload of the diode 21. If, for example, the capacitor 52 were connected directly to the point 46 the diode 21 would then feed directly to the junction 29 of transformer 40 through the capacitor 52 and then in parallel through the diodes 24 and 25 and the two ends of the resistor 41 to the tap 42 and thence to ground through the large capacitor 23. Since the resistor 41 is not necessarily of a large magnitude, such an arrangement might permit too large a current flow through the diode 21. The resistor 48 provides limiting means to the current flow through the diode 21.

Although the ratio of the resistor 49 to the resistor 48 and the ratio of the resistor 32 to the resistor 22 has been described as being 2:1 herein, the invention is not limited to such an arrangement. The important relationship between the four resistors 22, 32, 48, and 49 is as follows:

$$\frac{R_{48}}{R_{49}}=\frac{R_{22}}{R_{32}}$$

Such a relationship will always insure that the negative peak of the audio signal supplied to the tap 29 of transformer 40 will never exceed the negative D.C. voltage supplied to the tap 42 of resistor 41 even though 100% modulation may exist in the circuit.

The reason for having a D.C. voltage at the junction 19 whose magnitude varies as the unmodulated magnitude of the unmodulated I.F. signal will now be discussed.

Inasmuch as the maximum peak value of the audio signal appearing at tap 27 will vary with the strength of the incoming received signal, it can be seen that the bias applied to the tap 42 of resistor 41 must also be made to vary so as to remain substantially equal to the maximum negative peak value of the said audio signal appearing at the junction 53. Such a relationship is obtained by the use of the integrating circuit comprised of resistors 22 and 32 and capacitor 23. To facilitate an understanding of the foregoing statements, the following example (not actually shown) is set forth. Assume that a constant D.C. biasing potential of minus 5 volts is applied to the tap 42 from a suitable battery source. If the negative peak value of the audio signal appearing at point 53 should exceed minus 5 volts, the blanking detector 32 will be made nonconductive since the diodes 24 and 25 will be biased into a nonconductive state. On the other hand, if the negative peak value of the received signal appearing at junction 53 should have a value of, say, minus 1 volt, then any noise spike that would occur must exceed a minus 5 volts before cutting off the diodes 24 and 25; thus allowing a margin of 4 volts over received signal strength wherein noise pulses could occur without causing a blanking of the circuit. It is only when the D.C. voltage appearing at junction 19 remains substantially the same as (actually a few tenths of a volt greater than) the negative peak voltage of the received audio signal appearing at junction 53, that the circuit will function in its most advantageous manner.

As indicated hereinbefore the noise pulses are taken from the same frequency bandwidth that contains the intelligence bearing information. In accordance with this philosophy the bandwidth of the I.F. amplifier 18 is substantially the same as the bandwidth of the first I.F. amplifier 13.

It will be noted that the first I.F. amplifier 13 contains a delay means. The purpose of such delay means is to compensate for inherent delay existing in the noise I.F. amplifier 18 and in the circuit within the dotted rectangle 33. More specifically, since the noise I.F. amplifier 18 must amplify considerably more than the I.F. amplifier 13, it must have more stages. It follows that there will be more inherent delay in the noise I.F. amplifier 18 than there is in the I.F. amplifier 13. It is, of course, necessary that the detected noise pulse appearing at the tap 29 coincide in time with the corresponding noise pulses appearing in the output signal of the mixer 14.

It is to be noted that the forms of the invention herein shown and described are but preferred embodiments thereof and that various changes may be made in circuit arrangement and circuit components employed without departing from the spirit or the scope of the invention.

We claim:

1. In a signal receiving means comprising first circuit means for processing a received intelligence bearing carrier signal to extract the intelligence contained therein, a blanking circuit in said first circuit means, said blanking circuit constructed and arranged to respond to noise derived signals supplied thereto to block the said received signal from passing through said first circuit means, detecting means for detecting the received signal, second circuit means having an input circuit and comprising integrating means having a first output terminal, said second circuit being responsive to the detected received signal to produce at said first output terminal a D.C. signal whose amplitude varies as the average amplitude of the carrier portion of said received signal, said second circuit means further comprising a second output terminal and including third circuit means constructed and arranged to pass a proportionate amount of the detected received signal, including said noise derived signals, to said second terminal, said blanking circuit constructed to respond to said D.C. signal on said first output terminal to become biased into conductivity and to further respond to the signal on said second terminal to become nonconductive when the amplitude of the signal on said second terminal exceeds the amplitude of said D.C. signal.

2. A signal receiving means in accordance with claim 1 comprising a filter means connected across said second circuit means to produce at the input circuit of said second circuit means a composite signal consisting of the intelligence bearing portion of said received signal, said D.C. signal, and noise.

3. A signal receiving means in accordance with claim 1 comprising a filter means connected across said second circuit means to produce at the input circuit of said second circuit means a composite signal consisting of the intelligence bearing portion of said received signal, said D.C. signal, and noise and in which said integrating means comprises a first voltage divider having a first resistor and a second resistor connected across said filter means, and a capacitor connected across said second resistor.

4. A signal receiving means in accordance with claim 3 in which said second circuit means further comprises a second voltage divider connected across said filter means, said second voltage divider comprising a third resistor and a fourth resistor, and a series arrangement of a D.C. blocking capacitor and an impedance connected across said fourth resistor with the junction between said D.C. blocking capacitor and said impedance forming said second terminal.

5. A signal receiving means in accordance with claim 4 in which the ratio of the magnitude of said first resistor to the magnitude of said second resistor is substantially equal to the ratio of the magnitude of said third resistor to the magnitude of said fourth resistor.

6. In a signal receiving means comprising first circuit means for processing a received intelligence bearing carrier signal to extract the intelligence contained therein, a blanking circuit in said first circuit means, said blanking circuit constructed and arranged to respond to noise derived signals supplied thereto to block the said received signal from passing through said first circuit means, detecting means for detecting the received signal, second circuit means having an input circuit and comprising integrating means having a first output terminal, said second circuit being responsive to the detected received signal to produce at said first output terminal a D.C. signal whose amplitude varies as the average amplitude of the carrier portion of said received signal, said second circuit means further comprising a second output terminal and including third circuit means constructed and arranged to pass a proportionate amount of the detected received signal, including said noise derived signals, to said second terminal, said blanking circuit constructed to respond to said D.C. signal on said first output terminal to become biased into conductivity and to further respond to the signal on said second terminal to become nonconductive when the amplitude of the signal on said second terminal exceeds the amplitude of said D.C. signal, said third circuit means comprising voltage reducing means constructed to cause the intelligence bearing portion of the received signal to be insufficient to cause said blanking circuit to be non-conductive.

7. A signal receiving means in accordance with claim 6 comprising filter means connected across said second circuit means to produce at the input circuit of said second circuit means a composite signal consisting of the intelligence bearing portion of said received signal, said D.C. signal, and noise.

8. A signal receiving means in accordance with claim 6 comprising a filter means connected across said second circuit means to produce at the input circuit of said second circuit means a composite signal consisting of the intelligence bearing portion of said received signal, said D.C. signal, and noise and in which said integrating means comprises a first voltage divider having a first resistor and a second resistor connected across said filter means, and a capacitor connected across said second resistor.

9. A signal receiving means in accordance with claim 8 in which said second circuit means further comprises a second voltage divider connected across said filter means, said second voltage divider comprising a third resistor and a fourth resistor, and a series arrangement of a D.C. blocking capacitor and an impedance connected across said fourth resistor with the junction between said D.C. blocking capacitor and said impedance forming said second terminal.

10. A signal receiving means in accordance with claim 9 in which the ratio of the magnitude of said first resistor to the magnitude of said second resistor is substantially equal to the ratio of the magnitude of said third resistor to the magnitude of said fourth resistor.

References Cited in the file of this patent

UNITED STATES PATENTS 2,770,721 Clark ---------------- Nov. 13, 1956